(12) United States Patent
Burtin

(10) Patent No.: US 7,093,875 B2
(45) Date of Patent: *Aug. 22, 2006

(54) COMBINATION TRUCK BED LINER

(76) Inventor: Claudio Burtin, 100 Enterprise Dr., Cartersville, GA (US) 30120

( * ) Notice: Subject to any disclaimer, the term of this patent is extended or adjusted under 35 U.S.C. 154(b) by 0 days.

This patent is subject to a terminal disclaimer.

(21) Appl. No.: 11/041,581

(22) Filed: Jan. 24, 2005

(65) Prior Publication Data

US 2005/0127700 A1    Jun. 16, 2005

(51) Int. Cl.
*B60R 13/01* (2006.01)
(52) U.S. Cl. ..................... 296/39.1; 296/39.2
(58) Field of Classification Search ............... 296/39.1, 296/39.2
See application file for complete search history.

(56) References Cited

U.S. PATENT DOCUMENTS

| | | | | |
|---|---|---|---|---|
| D249,494 S | * | 9/1978 | Lambitz et al. ............ | D12/221 |
| 4,111,481 A | * | 9/1978 | Nix et al. .................. | 296/39.2 |
| 4,396,219 A | * | 8/1983 | Cline ........................ | 296/39.2 |
| 4,584,225 A | * | 4/1986 | Adelman .................... | 296/39.1 |
| 4,592,583 A | * | 6/1986 | Dresen et al. ............. | 296/39.2 |
| 4,595,229 A | * | 6/1986 | Wagner ..................... | 296/39.2 |
| 4,673,207 A | * | 6/1987 | Reynolds et al. .......... | 296/39.1 |
| 4,767,149 A | * | 8/1988 | Rye ........................... | 296/39.2 |
| 4,801,169 A | | 1/1989 | Queen et al. | |
| 4,890,874 A | | 1/1990 | Davis | |
| RE33,200 E | | 4/1990 | Reynolds et al. | |
| 4,944,612 A | * | 7/1990 | Abstetar et al. ........... | 296/39.2 |
| 4,986,590 A | | 1/1991 | Patti et al. | |
| 5,007,670 A | | 4/1991 | Wise | |
| 5,100,193 A | * | 3/1992 | Oprea et al. .............. | 296/39.2 |
| 5,154,478 A | | 10/1992 | Erickson et al. | |
| 5,215,345 A | * | 6/1993 | Orphan ..................... | 296/39.1 |
| 5,322,722 A | * | 6/1994 | Rozenberg ................. | 296/39.1 |
| 5,360,250 A | | 11/1994 | Wood et al. | |
| 5,419,603 A | * | 5/1995 | Kremer et al. ............ | 296/39.2 |
| 5,421,634 A | * | 6/1995 | Hackett ..................... | 296/39.2 |
| 5,551,742 A | | 9/1996 | Martindale et al. | |
| 5,755,481 A | | 5/1998 | Emery | |
| 5,806,909 A | * | 9/1998 | Wise ......................... | 296/39.1 |
| 5,814,398 A | | 9/1998 | Kronz et al. | |
| RE36,073 E | * | 2/1999 | Kremer et al. ............ | 296/39.2 |
| 5,927,787 A | * | 7/1999 | Emery et al. .............. | 296/39.1 |
| 5,988,723 A | | 11/1999 | Adkins | |
| 6,048,017 A | | 4/2000 | Doshi | |
| 6,059,343 A | | 5/2000 | Emery | |
| 6,131,983 A | * | 10/2000 | Jackson ..................... | 296/39.1 |
| 6,237,980 B1 | * | 5/2001 | Miles et al. ............... | 296/39.2 |

(Continued)

OTHER PUBLICATIONS

Mann Formulated Products; "Release Agent and Mold Release Selection Guide from Mann Formulated Products"; Polyurethane Elastomer Casting: available at http://www.mann-release.com/prodgude.htm. (4 pages).

*Primary Examiner*—Kirah B. Patel
(74) *Attorney, Agent, or Firm*—Mayer & Williams PC.; Mark D. Wieczorek, Esq.

(57) ABSTRACT

A protective liner for a truck bed, and a method for making the same. The liner includes a coated liner adhesively coupled to a truck bed, the coated liner having a first surface and a second surface opposite the first surface, the first surface contacting the truck bed and having a transverse section and a bed section, the transverse section and the bed section forming a cavity; and a pre-formed liner disposed within the cavity and at least partially contacting the second surface.

8 Claims, 1 Drawing Sheet

U.S. PATENT DOCUMENTS

| | | |
|---|---|---|
| 6,431,629 B1 | 8/2002 | Emery |
| 6,692,054 B1 | 2/2004 | Vitoorapakorn |
| 2002/0008398 A1 | 1/2002 | Long |
| 2002/0140247 A1* | 10/2002 | Emery ........................ 296/39.1 |
| 2002/0149223 A1 | 10/2002 | Saucier et al. |
| 2003/0094829 A1 | 5/2003 | Gardiner |
| 2004/0041427 A1 | 3/2004 | Vitoorapakorn et al. |
| 2004/0119310 A1 | 6/2004 | Bommarito et al. |
| 2004/0212209 A1* | 10/2004 | Vitoorapakorn et al. ... 296/39.2 |

* cited by examiner

COMBINATION TRUCK BED LINER

FIELD OF THE INVENTION

The present invention relates to truck bed liners, and more particularly to truck bed liners having multiple layers to provide various advantages and features.

BACKGROUND OF THE INVENTION

Truck bed liners protect the beds of trucks, such as pickups, against scratches, mars, and other damage that can otherwise occur. These liners are generally available in two forms. One is a "drop-in" liner that is a pre-formed plastic component that form-fits to the bed to be protected. The other is a spray-on liner and is formed by spraying a thick polymer coating to the bed and then curing the same.

Each of these previous liners has disadvantages. The "drop-in" liner, no matter how form-fitting, is generally unable to completely contact the truck bed at all points. Thus, pockets may occur in which water or other materials may pool or collect, deleteriously damaging the truck bed after time. To apply the spray-on liner usually requires a prior preparation of the truck bed to enhance adhesion, this application often including scratching the truck, deleteriously damaging the same.

SUMMARY OF THE INVENTION

In one aspect, the invention is directed to a protective liner for a truck bed, including a coated liner adhesively coupled to a truck bed, the coated liner having a first surface and a second surface opposite the first surface, the first surface contacting the truck bed and having a transverse section and a bed section, the transverse section and the bed section forming a cavity; and a pre-formed liner disposed within the cavity and at least partially contacting the second surface.

Implementations of the invention may include one or more of the following. The coated liner may include an internal mold release product. The internal mold release product may be selected from the group consisting essentially of zinc stearate or other such products. The coated liner may have a thickness on a bottom floor of the cavity of between about 100 mils and 150 mils. The coated liner may have a thickness at a top of a wall of the cavity of between about 50–60 mils. The coated liner may have a thickness on a bottom floor of the cavity and a thickness at a top of a wall of the cavity of between about 50–100 mils. The coated liner may be capable of removal from the truck bed leaving substantially no residue.

In another aspect, the invention is directed towards a method of protecting a truck bed, including coating a polymer liner onto a truck bed, such that the liner so coated has a first surface and a second surface opposite the first surface, the first surface contacting the truck bed and having a transverse section and a bed section, the transverse section and the bed section forming a cavity; and disposing a pre-formed liner within the cavity such that the pre-formed liner is at least partially contacting the second surface of a coated liner.

Implementations of the method may include one or more of the following. The coating may include spraying. The polymer-coated liner may include an internal mold release product. The coated liner may have a thickness on a bottom floor of the cavity of between about 100 mils and 150 mils, and a thickness at a top of a wall of the cavity of between about 50–60 mils.

Advantages of the invention may include one or more of the following. The invention may provide an extremely high level of protection of a truck bed. The invention may provide the benefits of both coated or spray-on liners as well as drop-in liners. The invention may provide the completeness of the bed protection of spray-on liners with the rigid protection of drop-in liners.

Other advantages will be apparent from the description that follows, including the figures and the claims.

DETAILED DESCRIPTION

Figure 1:
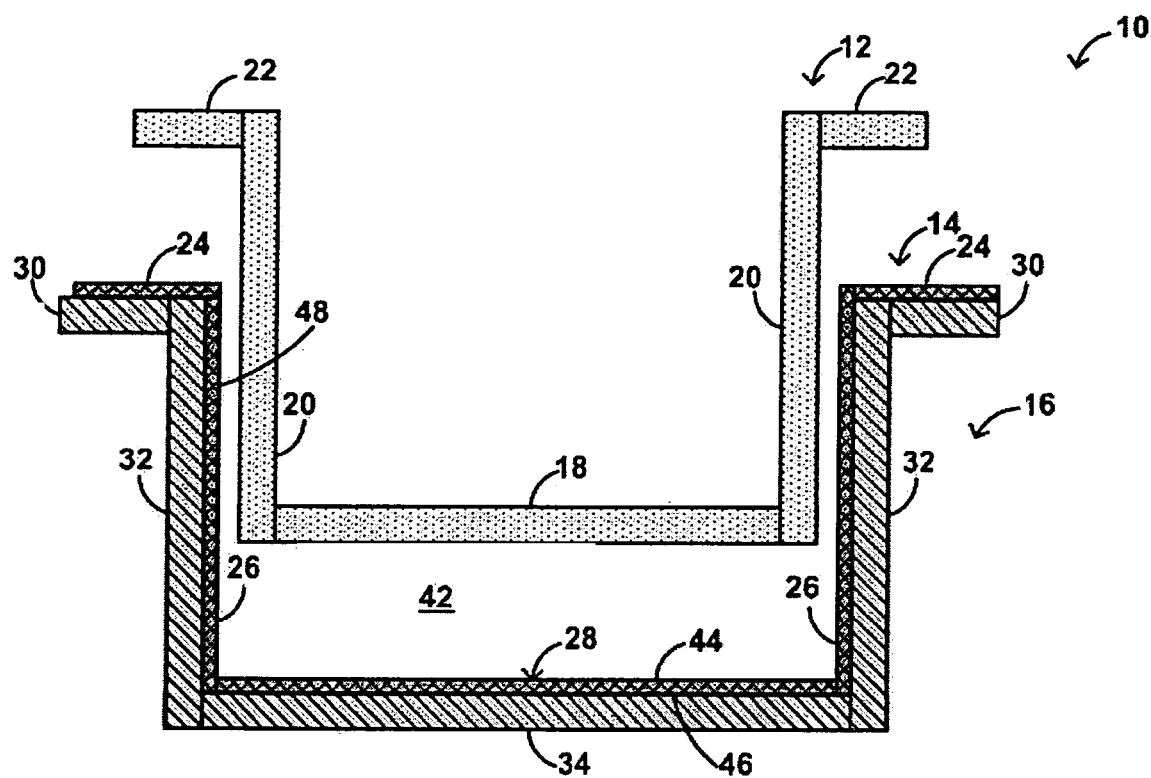
FIG. 1 is a schematic exploded drawing of a combination truck bed liner according to an embodiment of the present invention.
Figure 2:
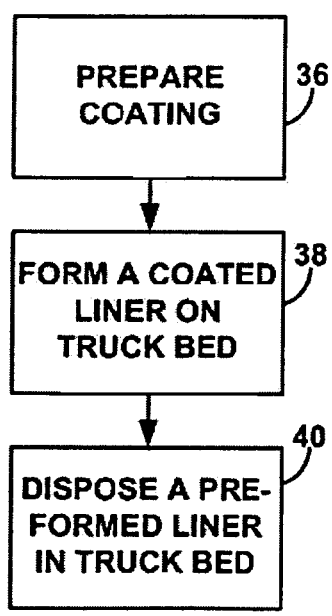
FIG. 2 is a flowchart describing a process according to an embodiment of the present invention.

Referring to FIG. 1, a combination truck bed liner 10 according to an embodiment of the invention is shown. The combination truck bed liner 10 includes a pre-formed liner 12 and a coated liner 14, which may be a spray-on liner, both of which are disposed on a truck bed 16.

The truck bed 16 has a floor 34, walls 32, and a lip 30. The floor 34 and walls 32 define a cavity 42, which may be a rectilinear or other shaped cavity. In many truck beds, various invaginations are present as well. The truck bed is typically made of a material such as steel, aluminum, or other metals or composites.

The coated liner 14 has a transverse section 26, a bed section 28, and a lip section 24. The coated liner 14 includes a first surface 46 and, opposite the first surface 46, a second surface 44. The coated liner 14 is typically sprayed-on, but may be applied using other techniques as well. The coated liner 14 may include an internal mold release additive as well, such as zinc stearate or other such products in order to ease removal of the coated liner 14 when desired. The internal mold release additive essentially makes the coated liner 14 less adherent to the truck bed 34, and allows the coated liner 14 to be removed from the truck bed 34, leaving a minimum of residue.

Following the installation in some fashion of the coated liner 14, a cavity 42 is formed by the transverse section 26 and the bed section 28. The cavity 42 is generally a rectilinear cavity, but it will be understood that the same may have a variety of shapes and the invention is thus not limited to rectilinear cavities.

Following the installation in some fashion of the coated liner 14, a pre-formed liner 12 may then be inserted. The pre-formed liner 12 may be form-fitted, friction-fitted, or otherwise disposed within the rectilinear cavity 42 and on the second surface 44.

Various pre-formed liners 12 may be employed in embodiments of the present invention, and these pre-formed liners are generally made of polymer materials or similar materials.

It is important to note that the use of the combination truck bed liner allows a generally thinner coated liner to be employed than would otherwise be employed if the coated liner were used alone. For example, while typical spray-on coated liners, that are used alone, may have a thickness at their bed section of 125 mils and a thickness at a top 48 of the transverse section of 50–60 mils, the overall thickness of the transverse section, bed section, and lip section 24 may be about 60 mils each.

It will be understood that the above description has been with respect to particular embodiments of the invention. Numerous variations of the above embodiments may be known to one of ordinary skill in the art, and these variations are within the scope of the invention. For example, while a rectilinear cavity shape for a spray-on liner has been disclosed, corresponding to a usual rectilinear cavity shape for a truck bed, rectilinearity is not required and the same may be circular for some applications. Accordingly, the scope of the invention is to be limited only by the claims appended hereto, and equivalents thereof.

What is claimed is:

1. A protective combination liner for a truck bed, such that material stored in a second cavity of the combination liner is protected from damaging the truck bed, comprising: a coated liner adhesively coupled to the truck bed, the coated liner having a first surface and a second surface opposite the first surface, the first surface contacting the truck bed and having a transverse section and a bed section, the transverse section and the bed section forming a first cavity, wherein the coated liner has a thickness on a bottom floor of the first cavity of less than 150 mils and includes an internal mold release product; and a pre-formed liner having a first side and a second side opposite the first side, the shape of the second side substantially similar to the shape of the second surface, the first side forming a surface of a second cavity, the pre-formed liner disposed within the first cavity and such that the second side of the pre-formed liner is at least partially contacting the second surface of the coated liner.

2. The liner of claim 1, wherein the internal mold release product is selected from the group consisting essentially of zinc stearate and other such products.

3. The liner of claim 1, wherein the coated liner has a thickness at a top of a wall of the first cavity of between about 50–60 mils.

4. The liner of claim 1, wherein the coated liner is capable of removal from the truck bed leaving substantially no residue.

5. A method of protecting a truck bed from damage due to contents sorted in the bed, comprising: coating a polymer liner onto the truck bed, such that the liner so coated has a first surface and a second surface opposite the first surface, the first surface contacting the truck bed and having a transverse section and a bed section, the transverse section and the bed section forming a first cavity, wherein the coated liner has a thickness on a bottom floor of the first cavity of less than 150 mils and includes an internal mold release product; and disposing a preformed liner within the cavity, the pre-formed liner having a first side and a second side opposite the first side, the shape of the second side substantially similar to the shape of the second surface, the first side forming a surface of a second cavity, and such that the second side of the pre-formed liner is at least partially contacting the second surface of the coated liner.

6. The method of claim 5, wherein the coating includes spraying.

7. The method of claim 6, wherein the internal mold release product is selected from the group consisting essentially of zinc stearate and other such products.

8. The method of claim 7, wherein the coated liner has a thickness at a top of a wall of the first cavity of between about 50–60 mils.

* * * * *